United States Patent
Hewel et al.

(10) Patent No.: US 10,450,459 B2
(45) Date of Patent: Oct. 22, 2019

(54) HIGH TEMPERATURE-RESISTANT POLYAMIDE MOULDING COMPOUNDS AND USES THEREOF ESPECIALLY IN THE AUTOMOTIVE SECTOR

(71) Applicant: EMS-PATENT AG, Domat/Ems (CH)

(72) Inventors: Manfred Hewel, Domat (CH); Georg Stoppelmann, Bonaduz (CH); Oliver Thomas, Domat (CH); Nikolai Lamberts, Bonaduz (CH)

(73) Assignee: EMS-PATENT AG, Domat/Ems (CH)

( * ) Notice: Subject to any disclaimer, the term of this patent is extended or adjusted under 35 U.S.C. 154(b) by 46 days.

(21) Appl. No.: 15/466,393

(22) Filed: Mar. 22, 2017

(65) Prior Publication Data

US 2017/0275459 A1  Sep. 28, 2017

(30) Foreign Application Priority Data

Mar. 23, 2016 (EP) .................................. 16161807

(51) Int. Cl.
| | |
|---|---|
| *C08L 77/06* | (2006.01) |
| *C08G 69/26* | (2006.01) |
| *B29C 67/24* | (2006.01) |
| *C08K 7/14* | (2006.01) |
| *B29K 77/00* | (2006.01) |
| *B29K 105/12* | (2006.01) |
| *B29K 105/16* | (2006.01) |
| *B29K 309/08* | (2006.01) |
| *B29K 507/04* | (2006.01) |

(52) U.S. Cl.
CPC .............. *C08L 77/06* (2013.01); *B29C 67/24* (2013.01); *C08G 69/265* (2013.01); *C08K 7/14* (2013.01); *B29K 2077/00* (2013.01); *B29K 2105/12* (2013.01); *B29K 2105/16* (2013.01); *B29K 2309/08* (2013.01); *B29K 2507/04* (2013.01); *C08L 2201/08* (2013.01); *C08L 2205/02* (2013.01)

(58) Field of Classification Search
CPC .... C08L 77/02; C08L 77/06; C08L 2205/025; C08G 69/265; C08K 7/14; B29C 67/24
USPC .......................................................... 524/291
See application file for complete search history.

(56) References Cited

U.S. PATENT DOCUMENTS

| | | | | | |
|---|---|---|---|---|---|
| 4,617,342 | A | * | 10/1986 | Poppe .................. | C08G 69/265 524/606 |
| 8,324,297 | B2 | * | 12/2012 | Hewel .................. | C08G 69/265 524/100 |
| 9,676,940 | B2 | * | 6/2017 | Lamberts ................ | C08L 77/00 |
| 2008/0274355 | A1 | | 11/2008 | Hewel | |
| 2012/0196973 | A1 | | 8/2012 | Doshi et al. | |
| 2013/0317168 | A1 | | 11/2013 | Buhler | |
| 2014/0171573 | A1 | | 6/2014 | Bayer et al. | |
| 2015/0175803 | A1 | * | 6/2015 | Stoppelmann ........... | C08K 3/22 428/35.7 |
| 2015/0218374 | A1 | * | 8/2015 | Thomas .................. | C08L 77/06 524/126 |
| 2016/0102202 | A1 | * | 4/2016 | Lamberts ................ | C08L 77/00 524/413 |
| 2017/0058123 | A1 | * | 3/2017 | Sutterlin ................ | C08G 69/26 |
| 2018/0155545 | A1 | * | 6/2018 | Stoppelmann .......... | C08L 77/02 |

FOREIGN PATENT DOCUMENTS

| | | |
|---|---|---|
| EP | 0 488 335 A2 | 6/1992 |
| EP | 1 988 113 A1 | 11/2008 |
| EP | 2 666 803 A1 | 11/2013 |
| EP | 2 746 339 A1 | 6/2014 |

OTHER PUBLICATIONS

European Search Report of 16161807.9 dated Oct. 13, 2016.

* cited by examiner

*Primary Examiner* — Hannah J Pak
(74) *Attorney, Agent, or Firm* — Sughrue Mion, PLLC

(57) ABSTRACT

A molding compound consisting of the components: (A)-(E), wherein the sum of (A)-(E) makes up 100 wt. %. Component A is 40-70 wt. % of at least one partially crystalline polyamide, made up of: (a1) 60-75 wt. % of 6T units; (a2) 20-35 wt. % of 6I units; (a3) 3-15 wt. % of 612 units; (a4) 0-5 wt. % of one of the following units: 66; 68; 69; 610; 6; or a mixture of such units; wherein the sum of (a1) to (a4) makes up 100 wt. % of (A). Component (B) is 30-60 wt. % of fibrous reinforcing materials. Component (C) is 0-30 wt. % of particulate fillers different from (B), (D) and (E). Component (D) is 0-2.0 wt. % of heat stabilizers, and component (E) is 0-6 wt. % of auxiliary agents and/or additives, different from (A)-(D).

28 Claims, No Drawings

HIGH TEMPERATURE-RESISTANT POLYAMIDE MOULDING COMPOUNDS AND USES THEREOF ESPECIALLY IN THE AUTOMOTIVE SECTOR

INDUSTRIAL FIELD

The present invention relates to high temperature-resistant polyamide moulding compounds with improved hydrolysis resistance, especially suitable for contact with cooling fluids at high temperature for example in the automotive sector.

PRIOR ART

Partially crystalline, partially aromatic polyamides or copolyamides were developed for use in high temperature environments and are characterized, especially with a content of at least 50 mol. % terephthalamide units, by their particularly good thermo-mechanical properties. The melting point of such polyamides typically lies in the range from 270 to 330° C., whereas melting points above 320° C. with long residence times in the processing machines can become a problem because of the high processing temperatures necessary. Demanding applications in the automotive sector and especially in contact with cooling fluid (water, glycol) additionally require good hydrolysis resistance at temperatures of greater than or equal to 130° C., and also good heat resistance and good mechanical properties, as is for example required by the GM Standard GMW16360 for glass fibre-reinforced polyphthalamides.

Materials suitable for such applications must exhibit low water absorption, since otherwise the necessary dimensional stability is not ensured. Further, the materials must also be processable into complex shapes. Thus, especially in the field of applications in the automotive sector there are again and again difficult shapes of components with undercuts, etc., for containers and lines and connectors etc. in the cooling system. For such shapes to be possible to create at all, the materials used, whether now reinforced with glass fibres or not, must also be suitable for being able to be removed without damage from the correspondingly complex injection moulding tool. Accordingly, relevant in this respect is the behaviour of the freshly moulded part at the moulding temperature. The moulded part must at this temperature still exhibit sufficient flexibility for it to be possible to remove it without damage. Characterizing parameters for this are the rigidity, the stress at break, and above all the strain at break at the moulding temperature.

Polyamide PA6T/6I (70:30) admittedly fulfils the said GM Standard as regards storage in a glycol/water mixture at 130° C. for 1008 hours, but at a moulding temperature of 130° C. has too high a rigidity and too low a strain at break for it to be possible to demould moulded parts with an undercut faultlessly, and with a melting point of 325° C. the processing with long residence times in the processing machine is a problem. Flexibilization can be achieved with this polyphthalamide, for example by integration of aliphatic 66 units, formed from 1,6-hexanediamine and adipic acid, so that copolyamides of the type PA6T/6I/66 are satisfactorily demouldable at a moulding temperature of 130° C. However, through this modification, the hydrolysis resistance and dimensional stability are reduced so markedly that the GM Standard GMW16360 is no longer fulfilled.

From EP-A-488335A2, moulding compounds based on an aromatic polyamide for the production of electrical connectors are known, comprising 50 to 100 mol. % of repeating units derived from terephthalic acid and 0 to 50 mol. % of repeating units derived from an aromatic dicarboxylic acid which is different from terephthalic acid and/or an aliphatic dicarboxylic acid with 4 to 20 carbon atoms and diamine units, derived from an aliphatic diamine and/or an alicyclic diamine, wherein the aromatic polyamide has an intrinsic viscosity of 0.5 to 3.0 dl/g, measured in concentrated sulphuric acid and a melting point of more than 300° C. Furthermore, the moulding compounds contain a specific graft-modified olefin polymer or diene copolymer and an aliphatic polyamide as blending components. The non-reinforced moulding compounds processed in the examples are based on the systems PA 6T/6I, PA 6T/66 and PA 6T/6I/610. However, these moulding compounds do not fulfil the aforesaid requirements for applications in the cooling fluid field, and in any case this disclosure is not concerned with hydrolysis resistance or the transport of cooling fluids.

From EP-A-2 746 339, thermal degradation-resistant polyamide moulding compounds based on partially crystalline, partially aromatic polyamides of the type 6T/6I/6 or 6T/6I/66 are known and moulded bodies produced therefrom.

From US-A-2012196973, thermoplastic compositions with the structure 612/6T and 610/6T are known, wherein the aliphatic blocks always make up the main part.

From EP-A-2 666 803, transparent moulding compounds of the type MACM12/MACMIMACMT/12 are known, which are especially scratch-resistant.

DESCRIPTION OF THE INVENTION

The invention is thus based inter alia on the objective of providing an improved moulding compound for the production of a moulded body, especially in the automotive sector, thus in particular an improved moulding compound which has high hydrolysis resistance in contact with glycol-water mixtures (coolants) at high temperature. Thereby at least the requirements according to GMW16360 should be fulfilled. That is, the stress at break and the strain at break after 1008 hours' storage in a mixture of glycol and water (1:1) at 130° C. (according to GMW15468, ISO 527-1/2) should for a degree of reinforcement of 35% be at least 110 MPa (stress at break) and 1.5% (strain at break) respectively and for a degree of reinforcement of 45% be at least 120 MPa (stress at break) and 2.0% (strain at break) respectively. Alternatively or additionally, the requirements according to GMW16360 should at least be fulfilled for somewhat shorter storage. That is, the stress at break and the strain at break after 504 hours storage in a mixture of glycol and water (1:1) at 130° C. (according to GMW15468, ISO 527-1/2) should for a degree of reinforcement of 35% be at least 105 MPa (stress at break) and 2.0% (strain at break) respectively and for a degree of reinforcement of 45% at least 130 MPa (stress at break) and 2.5% (strain at break) respectively.

Preferably however, the specified standards relating to the stress at break and the strain at break after 1008 hours storage and/or 504 hours storage in a mixture of glycol and water (1:1) at 130° C. should be exceeded, i.e. the stress at break should for a degree of reinforcement of 35% be at least 120 MPa and for a degree of reinforcement of 45% at least 140 MPa, and the strain at break should for a degree of reinforcement of 35% or 45% be at least 2.3% (storage 1008 hours) or at least 2.7% (storage 504 hours).

Furthermore, the moulding compound should have good dimensional stability, which is fulfilled for the intended applications in the automotive sector with a water absorption of preferably less than 3.7% or less than 3.5%. In addition, the moulded bodies produced from the moulding compound according to the invention should be demouldable from the tool even with demanding geometries such as for example undercuts. The good demouldability is ensured if the moulding compound has a strain at break of preferably at least 6.0%, preferably of at least 6.5% and particularly preferably of at least 7.0%, each at a moulding temperature of 130° C. (these values for the strain at break are to be understood without the prior storage of the test piece in glycol-water mixture). Furthermore, so that the moulding compounds can be optimally processed, the melting point of the base polymers and also of the moulding compounds should preferably not exceed a temperature of 315° C.

This problem is solved by a polyamide moulding compound, as is defined in the claims, or moulded parts, as are defined in the claims.

In specific terms, the present invention relates to a thermoplastic polyamide moulding compound consisting of the following components (A)-(E):
(A) 40-70 wt. % of at least one partially crystalline, partially aromatic polyamide, made up of:
  (a1) 60 to 77 wt. %, preferably 60 to 75 wt. % of 6T units, formed from 1,6-hexanediamine and terephthalic acid;
  (a2) 20 to 37 wt. %, preferably 20 to 35 wt. % of 6I units, formed from 1,6-hexanediamine and isophthalic acid;
  (a3) 3 to 20 wt. %, preferably 3 to 15 wt. % of 612 units, formed from 1,6-hexanediamine and dodecanedioic acid; and
  (a4) 0 to 5 wt. % of one of the following units: 66 units, formed from 1,6-hexanediamine and adipic acid; 68 units, formed from 1,6-hexane-diamine and suberic acid; 69 units formed from 1,6-hexanediamine and azelaic acid; 610 units formed from 1,6-hexanediamine and sebacic acid; 6 units formed from ε-caprolactam; or a mixture of such units;
  wherein the sum of the components (a1) to (a4) makes up 100 wt. % of the polyamide (A);
(B) 30-60 wt. % of fibrous reinforcing materials;
(C) 0-30 wt. % of particulate fillers different from (B), (D) and (E));
(D) 0-2.0 wt. % of heat stabilizers; and
(E) 0-6 wt. % of auxiliary agents and/or additives, different from (A)-(D);
wherein the sum of the components (A)-(E) makes up 100 wt. %.

Documents of the prior art do not describe any polyamide moulding compound with the claimed composition, let alone the suitability of such a polyamide moulding compound for the field of moulded parts in the cooling water field, and entirely different applications in documents with similar chemical compositions also cannot render such suitability obvious. In particular, they cannot lead those skilled in the art to suppose that such a moulding compound is capable of attaining the outstanding hydrolysis resistance at a temperature of at least 130° C. for such applications.

For the properties of the polyamide moulding compound, the totality of the purely aliphatic blocks within the component (A) also to a certain extent has a role in the aforesaid combination of properties. Accordingly, according to a further preferred embodiment, the component (A) is characterized in that the sum of the blocks (a3) and (a4), based on 100 wt. % of the polyamide (A), lies in the range from 5-15 wt. %, preferably in the range from 8-12 wt. %.

According to a first preferred embodiment, the polyamide moulding compound is characterized in that as regards 6T units the partially crystalline, partially aromatic polyamide of component (A) is made up of: (a1) 60 to 70 wt. %, preferably 62-68 wt. %, particularly preferably 63-66 wt. %, of 6T units, formed from 1,6-hexanediamine and terephthalic acid.

As regards 6I units it is simultaneously or independently therefrom preferably made up of: (a2) 20 to 30 wt. %, preferably 23-29 wt. %, particularly preferably 24-27 wt. %, of 6I units, formed from 1,6-hexanediamine and isophthalic acid.

As regards 612 units, the component (A) simultaneously or independently from the aforesaid settings for (a1) and/or (a2), is preferably made up of: (a3) 4 to 15 wt. %, preferably 5-13 wt. %, particularly preferably 7-13 or 8-12 wt. %, of 612 units, formed from 1,6-hexanediamine and dodecanedioic acid.

As regards further aliphatic units (a4), the component (A) simultaneously or independently from the aforesaid settings for (a1)-(a3) is preferably made up of: (a4) 0 to 5 wt. %, preferably 0-4 wt. %, particularly preferably 0.5-3 or 1-3 wt. %, of one of the following units: 66 units, formed from 1,6-hexanediamine and adipic acid; 68 units, formed from 1,6-hexanediamine and suberic acid; 69 units formed from 1,6-hexanediamine and azelaic acid; 610 units formed from 1,6-hexanediamine and sebacic acid; 6 units formed from ε-caprolactam; or a mixture of such units. Particularly preferably, the component (A) is free from units (a4), i.e. comprises exclusively the units (a1)-(a3).

In each of the aforesaid preferred embodiments for the contents of the components (a1)-(a4), it applies that the sum of the components (a1) to (a4) makes up 100 wt. % of the polyamide (A).

As regards constituent (a4) of the partially crystalline, partially aromatic polyamide of component (A), it applies according to a further preferred embodiment that this is one of the units selected from the following group: 66 units, formed from 1,6-hexanediamine and adipic acid; 6 units formed from ε-caprolactam; or a mixture of such units, wherein preferably the constituent (a4) is exclusively provided by 66 units, formed from 1,6-hexanediamine and adipic acid, preferably in a proportion in the range from 0-5 wt. %, preferably 0-4 wt. %, particularly preferably 0.5-3 wt. %.

The adjustment of the molecular mass of the ternary copolyamide 6T/6I/612 or the copolyamide 6T/6I/(a4)/612 and terminal groups thereof can be effected by
i. an excess of 1,6-hexanediamine or
ii. an excess of the dicarboxylic acids used terephthalic acid, isophthalic acid, dodecanedioic acid, sebacic acid, azelaic acid, suberic acid and adipic acid
iii. or by use of monofunctional amines
iv. or by use of monofunctional carboxylic acids.

Here the nature of the adjustment can also consist in a combination of (i) or (ii) with (iii) and/or (iv). Preferably an adjustment from the combination of (i) with (iv) is used. In this, at least one aliphatic, cycloaliphatic or aromatic monofunctional carboxylic acid is used, preferably an aromatic monocarboxylic acid, wherein the concentration of the monofunctional carboxylic acid lies in the range from 0.5 to 5 mol. %, preferably 1.0 to 2.5 mol. % and particularly preferably in the range from 1.4 to 1.9 mol. % based on the content of 1,6-hexanediamine. In specific terms, this preferably means that the mole ratio of the monofunctional carboxylic acid to 1,6-hexanediamine lies in the range from 0.005-0.05, preferably in the range from 0.010 to 0.025, particularly preferably in the range from 0.014-0.019.

According to a further preferred embodiment of the invention, the monofunctional carboxylic acid is selected from the group consisting of: acetic acid, propionic acid, stearic acid, 2-ethylhexanoic acid, cyclohexanoic acid and benzoic acid or mixtures thereof.

Furthermore, it is preferable if the mole ratio of 1,6-hexanediamine to the sum of the dicarboxylic acids used is at least 1.01, especially at least 1.03. That is, in the polymerization the starting materials are used such that a diamine excess is present. Preferably the mole ratio of 1,6-hexanediamine to the sum of the dicarboxylic acids used is at most 1.15. Preferred ranges for the ratio of diamine to dicarboxylic acids are 1.03 to 1.10, in particular 1.04 to 1.08.

The ternary copolyamide 6T/6I/612 or at least quaternary copolyamide 6T/6I/(a4)/612 is preferably built up with the aid of a preferably inorganic or organic phosphorus compound, wherein the phosphorus content based on the water-free batch (sum of all weighed amounts without water, i.e. sum of all monomers of the components (a1) to (a4)) lies in the range from 40-400 ppm (ppm, each weight-based), preferably 60-300 ppm and especially in the range from 70 to 150 ppm. Preferred phosphorus compounds are phosphoric acid, phosphorous acid, hypophosphorous acid, phenylphosphonic acid, phenylphosphinic acid and/or salts thereof with 1- to 3-valent cations such as for example Na, K, Mg, Ca, Zn or Al and/or esters thereof such as triphenyl phosphate, triphenyl phosphite or tris-(nonylphenyl) phosphite or mixtures thereof. Particularly preferably, hypophosphorous acid and sodium hydrogen hypophosphite monohydrate are used.

The present invention accordingly equally relates to a method for producing a polyamide moulding compound, such as was described above, and such as will also be still further described in detail below, which method is characterized in that either 1,6-hexanediamine, terephthalic acid, isophthalic acid, and dodecanedioic acid and optionally further aliphatic dicarboxylic acids or lactams, selected from the group adipic acid (C6), suberic acid (C8), azelaic acid (C9), sebacic acid (C10), and/or ε-caprolactam (C6) are taken as monomers, as well as other starting materials such as in particular regulators, catalysts, water etc., optionally as salts of the diamine with the appropriate diacids, and in a one-stage process or in a two-stage process with precondensate formation in the first stage and concluding polymerization in the second stage are polymerized to the component (A) and then or during the said second stage the further constituents (B)-(E) are added.

Alternatively, the process can be performed in more than two stages. Thus the constituents a1 to a4 can also be reacted singly and/or in combination, in each case in the form of preformed blocks in the sense of precondensates (preferably with a number average molecular mass from 500 to 5000 g/mol, preferably from 500 to 3000 g/mol, in particular in the range from 500 to 2500 g/mol, and/or expressed in terms of the solution viscosity ($\eta$rel), measured according to DIN EN ISO 307, in 0.5 wt. % m-cresol solution, temperature 20° C., granules, between 1.1 and 1.3, preferably between 1.1 and 1.2, particularly preferably between 1.12 and 1.17), or in the sense of post-condensates or polycondensates (preferably with a number average molecular mass of at least 5000 g/mol, especially in the range from 5000 to 30000 g/mol and/or expressed in terms of the solution viscosity ($\eta$rel), measured according to DIN EN ISO 307, in 0.5 wt. % m-cresol solution, temperature 20° C., granules, between 1.4 and 2.5, particularly preferably between 1.50 and 1.80) to give the polyamide (A). Thus for example the polyamide (A) can be produced by reaction between a first block, made up of the components (a1) and (a2), and a further block from the component (a3) and optionally the component (a4), or a mixture of one block from the component (a3) and one block from the component (a4), and then and/or during the said reaction of the blocks or already in the preparation of the blocks, the further constituents (B)-(E) can be added.

For the aforesaid requirements, in particular for the use in the automotive sector in contact with a coolant liquid, a specific combination of properties is necessary, namely in particular a melting point in a defined range, a strain at break at 130° C. above a defined value, a strain at break on storage over 1000 hours at 130° C. in a glycol-water mixture above a defined value, and water absorption below a defined value. Only if this specific combination of properties is effectively achieved are the polyamide moulding compounds suitable at all to be considered for this highly specialized application.

The properties of the polyamide moulding compound stated below are in each case preferable considered individually per se, but preferable above all in combination:

according to a preferred embodiment, the component (A) and/or the polyamide moulding compound as a whole has a melting point, determined according to ISO Standard 11357-3 on granules using differential scanning calorimetry (DSC) with a heating rate of 20° C./min, in the range from 295-315° C., preferably in the range from 300-315° C.;

according to a preferred embodiment, the component (A) and/or the polyamide moulding compound as a whole has a glass transition temperature, determined according to ISO Standard 11357-2 on granules using differential scanning calorimetry (DSC) with a heating rate of 20° C./min, of at least 100° C. and/or of less than 130° C., preferably in the range from 105 to 127° C., especially in the range from 110 to 125° C., preferably in the range from 120-125° C.;

according to a preferred embodiment, the component (A) and/or the polyamide moulding compound as a whole has a water absorption, after storage at 95° C. in water over a period of 336 hours, of at most 3.5%, preferably at most 3.4%, particularly preferably at most 3.35%;

according to a preferred embodiment, the component (A) and/or the polyamide moulding compound as a whole has a strain at break, measured according to ISO 527 with a traction speed of 5 mm/min, at a temperature in the range from 120-140° C., preferably at a temperature of 130° C., of at least 6.0%, preferably in the range from 6.0-10%;

according to a preferred embodiment, the component (A) and/or the polyamide moulding compound as a whole has a strain at break, measured according to ISO 527 with a traction speed for 5 mm/min, after storage at a temperature of 130° C. for 1008 hours according to GM Standard GMW15468 (2011) in a glycol-water mixture (1:1), of at least 2.0%, preferably at least 2.3%, particularly preferably in the range from 2.3-4%;

according to a preferred embodiment, the component (A) and/or the polyamide moulding compound as a whole has a solution viscosity ($\eta$rel), measured according to DIN EN ISO 307, in 0.5 wt. % m-cresol solution, temperature 20° C., granules, between 1.4 and 2.0, particularly preferably between 1.50 and 1.80;

according to a preferred embodiment, the component (A) and/or the polyamide moulding compound as a whole has an enthalpy of fusion, determined according to ISO Standard 11357-3 on the granules using differential scanning calorimetry (DSC) with a heating rate of 20° C./min, in the range from 20-55 J/g, especially in the range from 25-45 J/g. Preferred embodiments of component (A) have an enthalpy of fusion in the range from 35 to 55 J/g, especially from 38 to 48 J/g.

As regards the properties, the subsequent processing and/or utilization, these said properties, singly or in combination, are found to be advantageous.

Furthermore, in the copolyamide (A) the amino terminal groups preferably outweigh the carboxyl terminal groups, wherein the concentration of the amino terminal groups is preferably greater by at least 10 mmol/kg, particularly preferably by at least 20 mmol/kg than the concentration of the carboxyl terminal groups.

The polyamide moulding compound obligatorily contains in the form of component (B) a fibrous reinforcing material in a proportion of at least 30 weight percent and preferably at most 60 weight percent.

According to a preferred embodiment, the polyamide moulding compound is characterized in that the component (B) is present in a proportion, based on the sum of the components (A)-(E), in the range from 33-55 wt. %, preferably in the range from 35-45 wt. %.

The component (B) here can preferably be constituted of glass fibres or contain glass fibres as a constituent. The glass fibres here can have a circular cross-section, particularly preferably with a diameter in the range from 5-20 µm or in the range from 5-13 µm or 6-10 µm, or a non-circular cross-section, wherein the dimensional ratio of the major cross-section axis to the minor cross-section axis standing perpendicular thereto is preferably greater than 2.5, particularly preferably in the range from 2.5-6 or 3-5.

According to a preferred embodiment, the fibrous reinforcing materials of component (B) are thus used in the form of glass fibres.

The glass fibres can be used for example in the form of so-called short fibres (e.g. chopped glass with a length of 0.2-20 mm) or continuous fibres (rovings). The glass fibres (B) can have different cross-sectional areas, wherein glass fibres of circular cross-section (round fibres) and of non-circular cross-section (flat fibres) are preferable.

Glass fibres of circular cross-section, namely round glass fibres, preferably have a diameter in the range from 5-20 µm, preferably in the range from 5-13 µm and particularly preferably in the range from 6-10 µm. They are preferably used as short glass fibres (chopped glass with a length of 0.2 to 20 mm, preferably 2-12 mm).

In the case of the flat glass fibres, namely glass fibres of non-circular cross-section, those with a dimensional ratio of the major cross-section axis to the minor cross-section axis standing perpendicular thereto of more than 2.5, preferably in the range from 2.5 to 6, in particular in the range from 3 to 5 are preferably used. These so-called flat glass fibres have an oval, elliptical, elliptical with constrictions (so-called cocoon fibres), polygonal, rectangular or almost rectangular cross-sectional area. A further characterizing feature of the flat glass fibres used consists in that the length of the major cross-section axis preferably lies in the range from 6 to 40 µm, in particular in the range from 15 to 30 µm and the length of the minor cross-section axis in the range from 3 to 20 µm, in particular in the range from 4 to 10 µm. At the same time, the flat glass fibres have as high a packing density as possible, i.e. the glass cross-sectional area fills an imaginary rectangle surrounding the glass fibre cross-section as exactly as possible to at least 70%, preferably at least 80% and particularly preferably to at least 85%.

For reinforcement of the moulding compounds according to the invention, mixtures of glass fibres of circular and non-circular cross-section can also be used, wherein the proportion of flat glass fibres preferably predominates, i.e. makes up more than 50 wt. % of the total mass of the fibres.

Preferably the component (B) is selected from the group consisting of: E-glass fibres (according to ASTM D578-00 these consist of 52-62% silicon dioxide, 12-16% aluminium oxide, 16-25% calcium oxide, 0-10% borax, 0-5% magnesium oxide, 0-2% alkali metal oxides, 0-1.5% titanium dioxide and 0-0.3% iron oxide; preferably they have a density of 2.58±0.04 g/cm3, a tensile E modulus of 70-75 GPa, a stress at break of 3000-3500 MPa and a strain at break of 4.5-4.8%), A-glass fibres (63-72% silicon dioxide, 6-10% calcium oxide, 14-16% sodium and potassium oxides, 0-6% aluminium oxide, 0-6% boron oxide, 0-4% magnesium oxide), C-glass fibres (64-68% silicon dioxide, 11-15% calcium oxide, 7-10% sodium and potassium oxides, 3-5% aluminium oxide, 4-6% boron oxide, 2-4% magnesium oxide), D-glass fibres (72-75% silicon dioxide, 0-1% calcium oxide, 0-4% sodium and potassium oxides, 0-1% aluminium oxide, 21-24% boron oxide), basalt fibres (mineral fibres with the approximate composition: 52% SiO2, 17% Al2O3, 9% CaO, 5% MgO, 5% Na2O, 5% iron oxide and further metal oxides), AR-glass fibres (55-75% silicon dioxide, 1-10% calcium oxide, 11-21% sodium and potassium oxides, 0-5% aluminium oxide, 0-8% boron oxide, 0-12% titanium dioxide, 1-18% zirconium oxide, 0-5% iron oxide) and mixtures thereof.

A preferred embodiment of component (B) are high-strength glass fibres based on the ternary system silicon dioxide-aluminium oxide-magnesium oxide or on the quaternary system silicon dioxide-aluminium oxide-magnesium oxide-calcium oxide, wherein the sum of the contents of silicon dioxide, aluminium oxide and magnesium oxide is at least 78 wt. %, preferably at least 87% and particularly preferably at least 92% based on the whole glass composition.

Specifically, a composition of 58-70 wt. % silicon dioxide (SiO2), 15-30 wt. % aluminium oxide (Al2O3), 5-15 wt. % magnesium oxide (MgO), 0-10 wt. % calcium oxide (CaO) and 0-2 wt. % further oxides, such as for example zirconium dioxide (ZrO2), boron oxide (B2O3), titanium dioxide (TiO2) or lithium oxide (Li2O) is preferably used. In a further embodiment the high-strength glass fibre has a composition of 60-67 wt. % silicon dioxide (SiO2), 20-28 wt. % aluminium oxide (Al2O3), 7-12 wt. % magnesium oxide (MgO), 0-9 wt. % calcium oxide (CaO) and 0-1.5 wt. % further oxides, such as for example zirconium dioxide (ZrO2), boron oxide (B2O3), titanium dioxide (TiO2) and lithium oxide (Li2O).

It is particularly preferable if the high-strength glass fibre has the following composition: 62-66 wt. % silicon dioxide (SiO2), 22-27 wt. % aluminium oxide (Al2O3), 8-12 wt. % magnesium oxide (MgO), 0-5 wt. % calcium oxide (CaO), 0-1 wt. % further oxides, such as for example zirconium dioxide (ZrO2), boron oxide (B2O3), titanium dioxide (TiO2) and lithium oxide (Li2O).

The high-strength glass fibre has a stress at break of greater than or equal to 3700 MPa, preferably at least 3800 or 4000 MPa, a strain at break of at least 4.8%, preferably at least 4.9 or 5.0%, and a tensile E modulus of greater than 75 GPa, preferably more than 78 or 80 GPa, where these glass properties are to be determined on single fibres (pristine single filament) with a diameter of 10 µm and a length of 12.7 mm at a temperature of 23° C. and a relative atmospheric humidity of 50%. Specific examples of these high-strength glass fibres of component (B1) are S-glass fibres from Owens Corning with 995 size, T-glass fibres from Nittobo, HiPertex from 3B, HS4-glass fibres from Sinoma Jinjing Fiberglass, R-glass fibres from Vetrotex and S-1- and S-2-glass fibres from AGY.

The glass fibres (continuous fibres) used for example as roving preferably have a diameter (with round glass fibres) or a minor cross-section axis (with flat glass fibres) of 8 to 20 μm, preferably 12 to 18 μm, wherein the cross-section of the glass fibres can be round, oval, elliptical, elliptical with constriction(s), polygonal, rectangular or almost rectangular. Particularly preferred are so-called flat glass fibres with a ratio of the cross-section axes, i.e. a ratio of major to minor cross-section axis of 2.5 to 5. The continuous fibres can be produced from the glass types described above, with continuous fibres based on E-glass and the high-strength glass types being preferable. These continuous fibres are incorporated into the polyamide moulding compounds according to the invention by known processes for the production of long fibre-reinforced rod-shaped granules, in particular by pultrusion methods, in which the continuous fibre strand (roving) is completely impregnated with the polymer melt and then cooled and cut. The long fibre-reinforced rod-shaped granules obtained in this manner, which preferably have a granule length of 3 to 25 mm, especially 4 to 12 mm, can be further processed into moulded parts with the usual processing methods (such as for example injection moulding or pressing). Preferred as component (B) are glass fibres of E-glass, of non-circular cross-section (flat fibres) and with an axis ratio of the major cross-section axis to the minor cross-section axis of at least 2.5, and/or high-strength glass fibres of circular or non-circular cross-section and a glass composition, based essentially on the components silicon dioxide, aluminium oxide and magnesium oxide, wherein the proportion of magnesium oxide (MgO) is 5-15 wt. % and the proportion of calcium oxide 0-10 wt. %.

The glass fibres of component (B) preferably have as flat E-glass fibres a density of 2.54-2.62 g/cm3, a tensile E modulus of 70-75 GPa, a stress at break of 3000-3500 MPa and a strain at break of 4.5-4.8%, where the mechanical properties were determined on single fibres with a diameter of 10 μm and a length of 12.7 mm at 23° C. and a relative atmospheric humidity of 50%.

The glass fibres according to the invention can be provided with a size suitable for thermoplastics, in particular for polyamides, containing a coupling agent based on an amino- or epoxysilane compound.

The polyamide moulding compound optionally also contains in the form of component (C) particulate fillers, different from the other constituents (B), (D) and (E), in a proportion of at most 30 weight percent.

According to a preferred embodiment, the component (C) is present in a proportion, based on the sum of the components (A)-(E), in the range from at most 20 wt. %, preferably in the range from at most 10 wt. %, particularly preferably in the range from 0.1-5 wt. %.

The component (C) can, generally speaking, contain spheroidal and/or ellipsoidal fillers or be made up of these, wherein preferably silicate, metal, plastic, metal oxide, glass, mineral substance, dyestuff, pigment particles and mixtures of such particles can be used, wherein the fillers of component (C) are particularly preferably fillers, in surface-treated or untreated form, selected from the group consisting of: talc, mica, silicate, such as in particular iron aluminium silicate and/or sodium aluminium silicate particles, quartz, quartz powder, titanium dioxide, wollastonite, kaolin, silicic acids, especially amorphous silicic acid, ground or precipitated calcium carbonate, magnesium carbonate, magnesium hydroxide, chalk, limestone, feldspar, mica, barium sulphate, barium titanate, zinc sulphide, glass beads, especially solid or hollow glass beads, ground glass, in particular ground glass fibres, glass scales, glass flakes, permanently magnetic or magnetisable metal compounds and/or alloys, inorganic pigments, such as in particular iron oxide, iron manganese oxide, metal powders, in particular iron powder, copper powder, aluminium powder, metal flakes, in particular aluminium flakes, iron flakes, metal-coated fillers, metal oxides, in particular spinels, such as in particular copper iron spinel, copper chromium oxide, copper chromite (CuCr2O4), zinc-iron oxide, cobalt-chromium oxide, cobalt-aluminium oxide, magnesium aluminium oxide, copper-chromium-manganese mixed oxides, copper-manganese-iron mixed oxides, nickel-antimony titanate, chromium-antimony titanate, hard or soft magnetic metals or alloys or ceramics, hollow-sphere silicate fillers, aluminium oxide, boron nitride, boron carbide, aluminium nitride, calcium fluoride, and mixtures of the components from this group.

According to this further preferred embodiment, the moulding compound can thus contain as component (C) further fillers, in a proportion in the range from at most 20 wt. %, preferably in the range from at most 10 wt. %, particularly preferably in the range from 0.1-5 wt. % in the polyamide moulding compound, where the thermoplastic moulding compounds according to the invention can also contain a particulate filler or a mixture of two or more different particulate fillers in combination with reinforcing materials.

The polyamide moulding compound optionally also contains in the form of component (D) heat stabilizers, different from the other constituents (B), (C) and (E), in a proportion of at most 2 weight percent. Preferably the component (D) is present in a proportion, based on the sum of the components (A)-(E), in the range 0.1-2.0 wt. %, particularly preferably in the range from 0.2-1.5 wt. %.

The component (D) here can according to a preferred embodiment be selected from the following group:

Compounds of mono or divalent copper, in particular salts of mono or divalent copper with inorganic or organic acids or mono or divalent phenols, the oxides of mono or divalent copper, or the complex compounds of copper salts with ammonia, amides, lactams, cyanides or phosphines, preferably Cu(I) or Cu(II) salts of the hydrogen halide acids, hydrogen cyanide acids or the copper salts of the aliphatic carboxylic acids, where the monovalent copper compounds CuCl, CuBr, CuI, CuCN and Cu2O, and the divalent copper compounds CuCl2, CuSO4, CuO, copper(II) acetate or copper(II) stearate are particularly preferable, or mixtures of these compounds, where these copper compounds are used as such or preferably in the form of concentrates. Here concentrate should be understood to mean a polymer, preferably of the same or essentially the same chemical nature as component (A), which contains the copper salt in high concentration. In particular, the copper compounds are preferably used in combination with further metal halides, including alkali metal halides, such as NaI, KI, NaBr and KBr, wherein the molar ratio of metal halide to copper is 0.5 to 20, preferably 1 to 10 and particularly preferably 2 to 5;

Stabilizers based on secondary aromatic amines, where these stabilizers are preferably present in a quantity of 0.2 to 2, preferably 0.2 to 1.5 wt. %;

Stabilizers based on sterically hindered phenols, where these stabilizers are preferably present in a quantity of 0.1 to 1.5, preferably 0.2 to 1 wt. %;

Phosphites and phosphonites, and

Mixtures of the aforesaid stabilizers.

They are thus preferably compounds of mono or divalent copper, e.g. salts of mono or divalent copper with inorganic or organic acids or mono or divalent phenols, the oxides of mono or divalent copper, or the complex compounds of copper salts with ammonia, amines, amides, lactams, cyanides or phosphines, preferably Cu(I) or Cu(II) salts of the hydrogen halide acids, hydrogen cyanide acids or the copper salts of aliphatic carboxylic acids. Particularly preferable are the monovalent copper compounds CuCl, CuBr, CuI, CuCN and Cu2O, and the divalent copper compounds CuCl2, CuSO4, CuO, copper(II) acetate or copper(II) stearate.

The copper compound can be used as such or in the form of concentrates. Concentrate should here be understood to mean a polymer, preferably of the same chemical nature as component (A), which contains the copper salt in high concentration. Advantageously, the copper compounds are used in combination with further metal halides, in particular alkali metal halides such as NaI, KI, NaBr, KBr, wherein the molar ratio of metal halide to copper is 0.5 to 20, preferably 1 to 10 and particularly preferably 2 to 5. Preferably a combination of CuI and KI with a total concentration based on the moulding compound of 0.1 to 0.5 wt. %, especially 0.2 to 0.4 wt. % is used.

Also possible are stabilizers based on secondary aromatic amines, where these stabilizers are preferably present in a quantity of 0.2 to 2, preferably 0.2 to 1.5 wt. %.

Also possible are stabilizers based on sterically hindered phenols, where these stabilizers are preferably present in a quantity of 0.1 to 1.5, preferably 0.2 to 1 wt. %. Also possible are phosphites and phosphonites.

Also possible are mixtures of the aforesaid heat stabilizers.

Especially preferred examples of stabilizers usable according to the invention based on secondary aromatic amines are adducts of phenylenediamine with acetone (Naugard A), adducts of phenylenediamine with linolene, Naugard 445, N,N'-dinaphthyl-p-phenylenediamine, N-phenyl-N'-cyclohexyl-p-phenylenediamine or mixtures of two or more thereof.

Preferred examples of stabilizers based on sterically hindered phenols usable according to the invention are N,N'-hexamethylen-bis-3-(3,5-di-tert-butyl-4-hydroxyphenyl)-propionamide, bis-(3,3-bis-(4'-hydroxy-3'-tert-butylphenyl)-butanoic acid) glycol ester, 2,1'-thioethylbis-(3-(3,5-di-tert-butyl-4-hydroxyphenyl)-propionate, 4-4'-butyliden-bis-(3-methyl-6-tert.-butylphenol), triethylene glycol 3-(3-tert-butyl-4-hydroxy-5-methylphenyl)-propionate or mixtures of two or more of these stabilizers.

Preferred phosphites and phosphonites are triphenyl phosphite, diphenyl alkyl phosphite, phenyl dialkyl phosphite, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl)pentaerythritol diphosphite, diisodecyloxy pentaerythritol diphosphite, bis(2,4-di-tert-butyl-6-methylphenyl) pentaerythritol diphosphite, bis(2,4,6-tris-(tert-butylphenyl)) pentaerythritol diphosphite, diisodecyloxypentaerythritol diphosphite, tetrakis(2,4-di-tert-butylphenyl)-4,4'-biphenylene diphosphonite, 6-isooctyloxy-2,4,8,10-tetra-tert-butyl-12H-dibenz-[d,g]-1,3,2-dioxa-phosphocine, 6-fluoro-2,4,8,10-tetra-tert-butyl-12-methyl-dibenz[d,g]-1,3,2-dioxaphosphocine, bis(2,4-di-tert-butyl-6-methylphenyl) methyl phosphite and bis(2,4-di-tert-butyl-6-methylphenyl) ethyl phosphite. In particular, tris[2-tert-butyl-4-thio(2'-methyl-4'-hydroxy-5'-tert-butyl)-phenyl-5-methyl]phenyl phosphite and tris(2,4-di-tert-butylphenyl) phosphite (Hostanox® PAR24: commercial product of Clariant, Basel) are preferred. One preferred embodiment of the heat stabilizer consists in the combination of Irgatec NC 66 (obtainable from BASF) and a copper stabilization based on CuI and KI. Heat stabilization exclusively based on CuI and KI is particularly preferred.

The use of other transition metals or other transition metal compounds of group VB, VIB, VIIB and/or VIIIB of the periodic table together with the use of organic heat stabilizers and/or of copper or copper compounds is preferably excluded.

According to a further preferred embodiment, the heat stabilizers of component (D) are selected from the group of the phenol-based heat stabilizers, phosphite-based heat stabilizers, amine-based heat stabilizers, or mixtures or combinations thereof, where component (D) is particularly preferably selected from the following group: triethylene glycol bis(3-tert-butyl-4-hydroxy-5-methylphenyl)propionate, pentaerythritol tetrakis(3-(3,5-di-tert-butyl-4-hydroxyphenyl)propionate), N,N'-hexamethylenebis[3-(3,5-di-t-butyl-4-hydroxyphenyl)-propionamide], tris(2,4-di-tert-butylphenyl) phosphite, tris(2,4-di-tert-butylphenyl) phosphite, or mixtures thereof.

Preferred organic stabilizers are phenol- and/or phosphite compounds, such as for example Irganox 245, Irganox 1010, Irganox 1098, Hostanox PAR 24 or Irgafos 168. Particularly preferred is Irganox 1010 in a concentration of less than or equal to 0.5 wt. %.

The polyamide moulding compound optionally also contains in the form of component (E) further auxiliary agents and/or additives, different from the other constituents (A)-(D), in a proportion of at most 4 weight percent.

According to a preferred embodiment, the component (E) is present in a proportion, based on the sum of the components (A)-(E), in the range 0.1-4 wt. %, particularly preferably in the range from 0.2-3 wt. %.

Preferably the component (E) is selected from the following group: aliphatic polyamides, crystallization accelerators or retardants, flow aids, lubricants, parting agents, pigments, dye and marking substances, processing aids, antistatic agents, carbon black, graphite, carbon nanotubes, residues from polymerization processes such as catalysts, salts and derivatives thereof. Preferably, the component (E) is free from partially crystalline, partially aromatic polyamides.

As already explained above, the proposed polyamide moulding compound is in particular characterized in that it is suitable, when processed into a moulded body, preferably by injection moulding, extrusion or blow-moulding, for applications in the automotive sector, especially for the storage or transport of coolants, especially of coolants in the automotive sector at elevated temperature, preferably at temperatures of 130° C. and above.

Accordingly, the present invention also relates to moulded bodies, preferably produced by injection moulding, extrusion or blow-moulding, from a polyamide moulding compound, as described above, or having at least one region or one coating of polyamide moulding compound, as described above. These are preferably moulded bodies in the coolant circuit of automobiles, in particular coolant manifolds, water inlets and outlets, thermostats, coolers, cooling water boxes, pumps, valves and connectors in the coolant circuit.

The present invention further relates to a method for producing such a moulded body, preferably characterized in that a moulding compound, as was characterized above, is taken in molten form and the moulded body is formed from this moulding compound, preferably in an extrusion process, an injection moulding process or a blow-moulding process.

The thermoplastic moulding compounds according to the invention and moulded bodies produced therefrom are characterized by good thermal ageing stability, very good hydrolysis resistance, especially towards coolant liquids, dimensional stability and good process ability.

These moulding compounds are therefore suitable for the production of moulded bodies of any type by injection moulding, extrusion or blow-moulding, in particular by injection moulding for applications in the sanitary field, namely with contact with cold or hot water, such as for example water meters, water meter housings and water meter components (bearings, propellers, uprights), sanitary building components, tubes, pipes, tube connectors, fittings, e.g. for drinking water applications, valves, taps, domestic appliances, water heaters, rice cookers, steam cookers, steam irons, and parts for tea and coffee machines. The moulding compounds are also suitable for the production of moulded bodies in contact with hot water in the water supply, such as for example hot water tanks, and in heating and cooling systems. Among the heating systems, oil, gas, wood and solar heating and heat pumps and space heating systems may be mentioned.

Further possible applications in the automotive sector are cylinder head covers, engine covers, housings for intercoolers, intercooler valves, induction hoses, induction manifolds, connectors, especially for petrol, diesel, urea and compressed air lines, gear wheels, fan propellers, cooling water boxes, housings or housing parts for heat exchangers, coolant coolers, intercoolers, thermostats, water pumps, radiators, mounting parts, housings and functional parts for pumps, gears, valves, throttle valves, headlamp housings, reflectors, adaptive headlight components, gear wheels, plug connections, connectors, profiles, sheets or layers of multilayer sheets, electronic components, housings for electronic components, tools, composite materials, plastic-rubber composites, nozzles and fittings for connecting hoses or tubes.

Furthermore, one or multilayer hollow bodies can be produced from the moulding compound according to the invention, such as for example pipes or vessels. These for example include induction pipes for an automobile, liquid-bearing mono- or multilayer lines, which can be smooth or corrugated, for example fuel lines, hydraulic lines, brake lines, transmission lines, or coolant lines, brake fluid tanks or fuel tanks, preferably produced by injection moulding, extrusion or blow-moulding.

In particular, the moulded bodies include fluid-bearing parts or lines (gases and/or liquids) or parts which during normal use come into contact with fluids, where the fluid is in particular water, glycol, oil, fuels (petrol, diesel), alcohols (e.g. methanol, ethanol, isopropanol), or mixtures thereof. The moulded parts are preferably pipes, nozzles, connectors, or fittings and tanks, which can also antistatic protected, for the automotive sector. Specifically, smooth and corrugated pipes can be mentioned, pipe sections, nozzles (induction, venting, filling, exhaust), fittings for connecting hoses, corrugated pipes and medium-bearing pipes, constituent of multilayer pipes (outer, middle, inner layer), tanks, parts of tanks (e.g. closures), individual layers of multilayer tanks, covers or crankcase parts such as for example vents for crankcases, in the automotive sector, hydraulic lines, brake lines, brake fluid tanks, coolant fluid lines.

Particularly preferable are coolant manifolds in contact with water and/or glycol, coolant lines, pipe sections, nozzles, inlets and outlets, connectors, manifolds, fittings, housings, mixers, taps, filter housing, pumps, water pump housings, components for water pumps, thermostat housing, propellers for water pumps, valves, valve components (housing, shut-off ball valves, sliders, cylinders), manifolds, coolers, cooling water boxes, coolant storage housing, in the automotive sector.

Further embodiments are stated in the dependent claims.

DESCRIPTION OF PREFERRED EMBODIMENTS

Preferred embodiments of the invention are described below on the basis of the practical examples which serve only for explanation and are not to be regarded as limiting.
Description of Production:

The production of the polyamide moulding compounds according to the practical examples is effected according to the method described in EP 1 988 113 A1. Here reference is in particular made to the method as it is described in EP-A 1 988 113 in para. [0038] and [0113]-[0120], as regards production method, these text sections are expressly also incorporated into the disclosure content of this application. Monomers, catalyst and regulator are placed in the plant and a precondensate produced. The dried precondensate is further condensed in the extruder. The post-condensate is then mixed with glass fibres and additives and granulated. Test pieces are prepared from the granules and the properties tested as described in more detail below.
Materials Used:
PA-3: Partially crystalline, partially aromatic polyamide PA 6T/6I from 1,6-hexanediamine, terephthalic acid (70 mol. %) and isophthalic acid (30 mol. %) with a melting point of 325° C. and a relative viscosity of $\eta_{rel}$=1.58;
Antifoam: DOW CORNING® RD Antifoam Emulsion 10% silicone emulsion
Irganox 1010: Pentaerythritol tetrakis-[3-(3,5-di-tert-butyl-4-hydroxyphenyl)-propionate, Antioxidant based on a sterically hindered phenol, obtainable from Ciba Specialty Chemicals, Inc.
MB BLACK: Carbon black masterbatch from 75% polyamide PA66 and 25% carbon black (PB4750)
Glass fibres: CPIC ECT301HP: E-glass diameter 10 μm (cross-section surface round), length 4.5 mm, obtainable from CHONGQING POLYCOMP INTERNATIONAL CORP., China
Preparation of the Test Pieces:

The test pieces were prepared on an Arburg Allrounder injection moulding machine, wherein the cylinder temperatures of 250° C. to 350° C. and a screw peripheral speed of 15 m/min were set. The moulding temperature was 130° C.
Measurement Methods:

The measurements were performed according to the following Standards and on the following test pieces and in the dry state, unless otherwise noted in the following tables.
Tensile E-modulus: ISO 527 with a drawing speed of 1 mm/min, ISO tensile rod, Standard: ISO/CD 3167, type A1, 170×20/10×4 mm, temperature 23° C. or 130° C.
Stress at break and strain at break: ISO 527 with a drawing speed of 5 mm/min. ISO tensile rod, Standard: ISO/CD 3167, type Al, 170×20/10×4 mm, temperature 23° C. or 130° C.

Relative viscosity: DIN EN ISO 307, in 0.5 wt. % m-cresol solution, temperature 20° C.

Water absorption: ISO tensile rods are stored in water at a temperature of 95° C. for the period of 336 hours. After drying of the surface with a cotton cloth, the percentage weight increase relative to the starting weight (dry ISO tensile rod) is determined.

Hydrolysis stability towards coolant: the hydrolysis stability is determined according to GM Standard GMW15468 (2011). For this, test pieces (ISO tensile rod), dry as arising in the injection moulding, are stored in a glycol-water mixture (1:1) for 504 or 1008 hours at 130° C. in a pressure vessel. The glycol is the VW coolant additive G13 according to Standard VW TL 774 J. After the storage has ended, the test bodies in the coolant are cooled to 23° C., rinsed with water after removal from the coolant, rubbed down with a cotton cloth and dried in the desiccator over silica gel. Within 7 days after the removal of the sample, the previously described tensile test according to ISO 527 is performed on the stored test pieces.

Thermal behaviour (melting point, enthalpy of fusion and glass transition temperature (Tg): ISO Standard 11357-1, 2 and 3, granules, the differential scanning calorimetry (DSC) is performed with a heating rate of 20° C./min.

Impact resistance and notch impact resistance according to Charpy were measured according to ISO 179/keU on the ISO test rod, Standard: ISO/CD 3167, type B1, 80×10×4 mm at a temperature of 23° C.

The thermal dimensional stability HDT A (1.8 MPa) was measured according to DIN EN ISO 75-1 and 2, on the ISO impact rod with the dimension 80×10×4 mm in flat end position.

Results:

The results are summarized in the following tables, wherein the examples according to the invention are summarized in Table 2 and the comparison examples in Table 3. Table 1 shows the reaction batch of the copolyamides used in the examples and comparison examples.

TABLE 1 copolyamides PA-1 to PA-7

| | | CoPA | | | | | |
|---|---|---|---|---|---|---|---|
| | | PA-1 | PA-2 | PA-4 | PA-5 | PA-6 | PA-7 |
| Composition CoPA 6T/6I/66/612 | | 63/27/0/10 | 65/25.5/4.5/5 | 65/25/10/0 | 66.5/28.5/5/0 | 63/27/10/0 | 66.2/22.5/11.3/0 |
| 1,6-hexanediamine | kg | 31.1149 | 31.4991 | 31.9138 | 31.7946 | 31.9138 | 31.9457 |
| Terephthalic acid | kg | 27.0095 | 27.7821 | 27.7457 | 28.4015 | 28.5931 | 28.2442 |
| Isophthalic acid | kg | 11.5632 | 10.8991 | 10.6619 | 12.1721 | 9.8143 | 9.5844 |
| Adipic acid | kg | | 1.8420 | 4.0754 | 2.0287 | 40.757 | 4.6226 |
| Dodecanedioic acid | kg | 4.7029 | 2.3682 | | | | |
| NaH$_2$PO$_2$*H$_2$O | kg | | | 0.0257 | 0.0257 | 0.0257 | 0.0257 |
| H$_3$PO$_2$ (50% in water) | kg | 0.0319 | 0.0319 | | | | |
| Benzoic acid | kg | 0.5475 | 0.5475 | 0.5475 | 0.5475 | 0.5475 | 0.5475 |
| Antifoam | kg | 0.0300 | 0.0300 | 0.0300 | 0.0300 | 0.0300 | 0.0300 |
| Water | kg | 25.0000 | 25.0000 | 25.0000 | 25.0000 | 25.0000 | 25.0000 |

The systems of the general type PA 6T/6I/66 used for the comparison examples essentially correspond to polyamide types, as are known from USRE34447 from a different technical context.

TABLE 2

Composition and properties of examples B1 to B5 according to the invention.

| Components | Unit | B1 | B2 | B3 | B4 | B5 |
|---|---|---|---|---|---|---|
| PA-1 | wt. % | 65.3 | 63.3 | 61.3 | 53.3 | |
| PA-2 | wt. % | | | | | 61.3 |
| MB BLACK | wt. % | 1.2 | 1.2 | 1.2 | 1.2 | 1.2 |
| Glass fibre | wt. % | 33 | 35 | 37 | 45 | 37 |
| Irganox 1010 | wt. % | 0.5 | 0.5 | 0.5 | 0.5 | 0.5 |
| Composition CoPA 6T/6I/66/612 | wt. % | 63/27/0/10 | 63/27/0/10 | 63/27/0/10 | 63/27/0/10 | 65/25.5/4.5/5 |
| Properties | | | | | | |
| Relative viscosity | | 1.692 | 1.674 | 1.691 | 1.632 | 1.722 |
| Melting point | ° C. | 314 | 308 | 309 | 307 | 312 |
| Enthalpy of fusion[1)] | J/g | 30 | 29 | 28 | 25 | 25 |
| Tg | ° C. | 122 | 121 | 121 | 121 | 123 |
| Tensile E modulus | | | | | | |
| 23° C. | [MPa] | 13350 | 13800 | 14090 | 17050 | 14320 |
| 130° C. | [MPa] | 5020 | 4750 | 5230 | 5840 | 5970 |
| Stress at break | | | | | | |
| 23° C. | [MPa] | 209 | 230 | 232 | 254 | 228 |
| 130° C. | | 83 | 80 | 88 | 87 | 91 |

TABLE 2-continued

Composition and properties of examples B1 to B5 according to the invention.

| Components | Unit | B1 | B2 | B3 | B4 | B5 |
|---|---|---|---|---|---|---|
| Strain at break | | | | | | |
| 23° C. | [%] | 2.3 | 2.5 | 2.4 | 2.4 | 2.2 |
| 130° C. | | 7.8 | 8.6 | 8.1 | 7.6 | 6.3 |
| Water absorption | [%] | 3.4 | 3.2 | 3.2 | 2.7 | 3.3 |
| Tensile E modulus[2)] | | | | | | |
| 504 h/130° C. | [MPa] | 9260 | 9620 | 10140 | 12415 | 10240 |
| 1008 h/130° C. | [MPa] | 9150 | 9880 | 10410 | 12790 | 10720 |
| Stress at break[2)] | | | | | | |
| 504 h/130° C. | [MPa] | 134 | 136 | 144 | 153 | 139 |
| 1008 h/130° C. | [MPa] | 121 | 133 | 137 | 148 | 129 |
| Strain at break[2)] | | | | | | |
| 504 h/130° C. | [%] | 3.3 | 3.9 | 3.9 | 3.5 | 3.1 |
| 1008 h/130° C. | [%] | 2.4 | 3.3 | 2.7 | 3.0 | 2.4 |
| HDT A (1.8 MPa) | ° C. | n.d. | 268 | n.d. | 275 | n.d. |

[1)] Enthalpies of fusion of PA-1 and PA-2 are 45 and 40 J/g respectively
[2)] after storage in glycol (coolant additive G13)/water mixture (1:1) in accordance with the stated time and temperature Examples B1-B5 fulfil all further requirements set in the Standard GMW 16360, thus in particular also the notch impact resistance after storage for 1000 h/170° C. and the stress at break after storage for 1000 h/170° C. (notch impact resistance according to ISO 179 at 23° C. and stress at break according to ISO527 at 23° C. after 1000 hours storage at 170° C. according to ISO 188; Method A: circulating air oven; relative to the corresponding values before storage; unaged samples).

TABLE 3

Composition and properties of comparison examples V1 to V7.

| Components | Unit | V1 | V2 | V3 | V4 | V5 | V6 | V7 | V8 |
|---|---|---|---|---|---|---|---|---|---|
| PA-3 | wt. % | | | | | | 65.3 | 58.3 | 48.3 |
| PA-4 | wt. % | 65.3 | | | | | | | |
| PA-5 | wt. % | | 65.3 | | | | | | |
| PA-6 | wt. % | | | 65.3 | | | | | |
| PA-7 | wt. % | | | | 65.3 | | | | |
| MB BLACK | wt. % | 1.2 | 1.2 | 1.2 | 1.2 | 1.2 | 1.2 | 1.2 | 1.2 |
| Glass fibre | wt. % | 33 | 33 | 33 | 33 | 37 | 33 | 40 | 50 |
| Irganox 1010 | wt. % | 0.5 | 0.5 | 0.5 | 0.5 | 0.5 | 0.5 | 0.5 | 0.5 |
| Composition CoPA 6T/6I/66/612 | wt. % | 65/25/10/0 | 66.5/28.5/5/0 | 63/27/10/0 | 66.2/22.5/11.3/0 | 65/25/10/0 | 70/30/0/0 | 70/30/0/0 | 70/30/0/0 |
| Properties | | | | | | | | | |
| Relative viscosity | | 1.668 | 1.676 | 1.676 | 1.742 | 1.710 | 1.666 | 1.688 | 1.691 |
| Melting point | ° C. | 316 | 315 | 313 | 311 | 316 | 325 | 325 | 325 |
| Tg | ° C. | 126 | 126 | 121 | 123 | 126 | 130 | 130 | 130 |
| Tensile E modulus | | | | | | | | | |
| 23° C. | MPa | 13620 | 12520 | 13450 | 12780 | 15700 | 12550 | 15050 | 18980 |
| 130° C. | MPa | 6040 | 5240 | 4580 | 4870 | 6200 | 8750 | 9350 | 11850 |
| Stress at break | | | | | | | | | |
| 23° C. | MPa | 215 | 208 | 205 | 200 | 228 | 225 | 246 | 283 |
| 130° C. | MPa | 89 | 85 | 83 | 78 | 95 | 115 | 132 | 135 |
| Strain at break | | | | | | | | | |
| 23° C. | % | 2.1 | 2.3 | 2.2 | 2.3 | 2.2 | 2.5 | 2.3 | 2.3 |
| 130° C. | % | 5.8 | 8.5 | 9.9 | 6.7 | 5.5 | 4.5 | 4.1 | 3.8 |
| Water absorption 336 h H2O 95° C. | % | 3.7 | 3.9 | 4.0 | 3.9 | 3.6 | 3.5 | 2.8 | 2.3 |
| Tensile E modulus[2)] | | | | | | | | | |
| 504 h/130° C. | MPa | 9880 | 8270 | 7950 | 8250 | 10080 | 10040 | 12070 | 15310 |
| 1008 h/130° C. | MPa | 9250 | 8520 | 7780 | 8380 | 9930 | 9770 | 12350 | 16030 |
| Stress at break[2)] | | | | | | | | | |
| 504 h/130° C. | MPa | 132 | 121 | 116 | 99 | 132 | 153 | 169 | 185 |
| 1008 h/130° C. | MPa | 103 | 106 | 93 | 93 | 121 | 128 | 138 | 154 |

TABLE 3-continued

Composition and properties of comparison examples V1 to V7.

| Components | Unit | V1 | V2 | V3 | V4 | V5 | V6 | V7 | V8 |
|---|---|---|---|---|---|---|---|---|---|
| Strain at break[2] | | | | | | | | | |
| 504 h/130° C. | % | 2.9 | 4.2 | 4.2 | 3.1 | 3.2 | 3.0 | 2.6 | 2.5 |
| 1008 h/130° C. | % | 1.8 | 2.2 | 2.2 | 2.0 | 2.4 | 2.1 | 1.7 | 1.5 |
| HDT A (1.8 MPa) | ° C. | 276 | n.d. | n.d. | n.d. | n.d. | 280 | 280 | 280 | n.d.: not determined
[2] after storage in glycol (coolant additive G13)/water mixture (1:1) in accordance with the stated time and temperature Discussion of the Results:

The examples presented show that the copolyamides of the prior art do not meet the stability in glycol/water at 130° C. (GM Standard GMW15468 (2011)) required by GMW16360. The comparison examples V1 to V5 yield an insufficient stress at break, while V7 and V8 after storage exhibit too low a strain at break. Furthermore, because of the water absorption, V1 to V5 have insufficient dimensional stability. Further, some moulding compounds in the comparison examples exhibit problems in demoulding, i.e. the moulded parts can only be demoulded from the tool with damage (tool temperature is 130° C.). This is also reflected in the excessively low strain at break at 130° C. (V1, V5, V6 to V8). In contrast, the moulding compounds according to the invention have very good hydrolysis resistance in glycol/water at 130° C. and thus markedly exceed the requirements of the GM Standard GMW16360 for glass fibre-reinforced polyphthalamides. At the same time, these moulding compounds are readily demouldable, have a strain at break of more than 6.0% and because of their moderate melting point in the range from 307 to 314° C. and a glass transition temperature (Tg) in the range from 121 to 123° C. are processable without difficulty. Thus only the moulding compounds in the examples B1 to B5 possess the necessary combination of good hydrolysis resistance, good dimensional stability, good demouldability and good processability.

The invention claimed is:

1. A polyamide moulding compound consisting of the following components (A)-(E):
   (A) 40-70 wt. % of at least one partially crystalline, partially aromatic polyamide, made up of:
      (a1) 60 to 77 wt. % of 6T units, formed from 1,6-hexanediamine and terephthalic acid;
      (a2) 20 to 37 wt. % of 6I units, formed from 1,6-hexanediamine and isophthalic acid;
      (a3) 3 to 20 wt. % of 612 units, formed from 1,6-hexanediamine and dodecanedioic acid; and
      (a4) 0 to 5 wt. % of one of the following units: 66 units, formed from 1,6-hexanediamine and adipic acid; 68 units, formed from 1,6-hexane-diamine and suberic acid; 69 units formed from 1,6-hexanediamine and azelaic acid; 610 units formed from 1,6-hexanediamine and sebacic acid; 6 units formed from ε-caprolactam; or a mixture of such units;
      wherein the sum of the components (a1) to (a4) makes up 100 wt. % of the polyamide (A);
   (B) 30-60 wt. % of fibrous reinforcing materials;
   (C) 0-30 wt. % of particulate fillers different from (B), (D) and (E);
   (D) 0-2.0 wt. % of heat stabilizers; and
   (E) 0-6 wt. % of auxiliary agents and/or additives, different from (A)-(D);
   wherein the sum of the components (A)-(E) makes up 100 wt. %.

2. The polyamide moulding compound according to claim 1, wherein the sum of the components (a3) and (a4), based on 100 wt. % of the polyamide (A), lies in the range from 5-15 wt. %.

3. The polyamide moulding compound according to claim 1, wherein the partially crystalline, partially aromatic polyamide of component (A) is made up of:
   (a1) 60 to 70 wt. %, of 6T units, formed from 1,6-hexanediamine and terephthalic acid;
   (a2) 20 to 30 wt. %, of 6I units, formed from 1,6-hexanediamine and isophthalic acid;
   (a3) 4 to 15 wt. %, of 612 units, formed from 1,6-hexanediamine and dodecanedioic acid;
   (a4) 0 to 5 wt. %, of one of the following units: 66 units, formed from 1,6-hexanediamine and adipic acid; 68 units, formed from 1,6-hexanediamine and suberic acid; 69 units formed from 1,6-hexanediamine and azelaic acid; 610 units formed from 1,6-hexanediamine and sebacic acid; 6 units formed from ε-caprolactam; or a mixture of such units;
   wherein the sum of the components (a1) to (a4) makes up 100 wt. % of the polyamide (A).

4. The polyamide moulding compound according to claim 1, wherein the constituent (a4) of the partially crystalline, partially aromatic polyamide of component (A) is one of the following units: 66 units, formed from 1,6-hexanediamine and adipic acid; 6 units formed from ε-caprolactam; or a mixture of such units.

5. The polyamide moulding compound according to claim 1, wherein a molecular mass and/or terminal groups of the least one partially crystalline, partially aromatic polyamide are adjusted by means of at least one aliphatic, cycloaliphatic or aromatic monofunctional carboxylic acid.

6. The polyamide moulding compound according to claim 1, wherein the component (A) and/or the polyamide moulding compound as a whole has a melting point, determined according to ISO Standard 11357-3 on granules using differential scanning calorimetry (DSC) with a heating rate of 20° C./min, in the range from 295-320° C.;
   and/or that the component (A) and/or the polyamide moulding compound as a whole has a glass transition temperature, determined according to ISO Standard 11357-2 on the granules using differential scanning calorimetry (DSC) with a heating rate of 20° C./min, in the range from at least 100° C. and at most 130° C.;
   and/or that the component (A) and/or the polyamide moulding compound as a whole has a water absorption, after storage at 95° C. in water over a period of 336 hours, of at most 3.5%;
   and/or that the component (A) and/or the polyamide moulding compound as a whole has a strain at break, measured according to ISO 527 with a drawing speed of 5 mm/min, at a temperature in the range from 120-140° C., of at least 6.0%;

and/or that the component (A) and/or the polyamide moulding compound as a whole has a strain at break, measured according to ISO 527 with a drawing speed of 5 mm/min, after storage at a temperature of 130° C. for 1008 hours according to GM Standard GMW15468 (2011) in a glycol-water mixture (1:1), of at least 2.0%;

measured according to DIN EN ISO 307, in 0.5 wt. % m-cresol solution, temperature 20° C., granules, between 1.4 and 2.0;

and/or that the component (A) and/or the polyamide moulding compound as a whole has an enthalpy of fusion, determined according to ISO Standard 11357-3 on the granules using differential scanning calorimetry (DSC) with a heating rate of 20° C./min, in the range from 20-55 J/g.

7. The polyamide moulding compound according to claim 1, wherein the component (B) is present in a proportion, based on the sum of the components (A)-(E), in the range from 33-55 wt. %.

8. The polyamide moulding compound according to claim 1, wherein the component (B) is made up of glass fibres or contains glass fibres, wherein
the glass fibres have a circular cross-section,
or a non-circular cross-section.

9. The polyamide moulding compound according to claim 1, wherein the component (C) is present in a proportion, based on the sum of the components (A)-(E), in the range from at most 20 wt. %.

10. The polyamide moulding compound according to claim 1, wherein the component (C) contains spheroidal and/or ellipsoidal fillers or is made up of these.

11. The polyamide moulding compound according to claim 1, wherein the component (D) is present in a proportion, based on the sum of the components (A)-(E), in the range 0.1-2.0 wt. %,
or in that the component (D) is selected from the following group:
stabilizers based on secondary aromatic amines;
stabilizers based on sterically hindered phenols, phosphites and phosphonites and
mixtures of the aforesaid stabilizers.

12. The polyamide moulding compound according to claim 1, wherein the component (E) is present in a proportion, based on the sum of the components (A)-(E), in the range 0.1-4 wt. %,
and/or that the component (E) is selected from the following group: aliphatic polyamides, crystallization accelerators or retardants, flow aids, lubricants, parting agents, pigments, dyes and marking substances, processing aids, antistatic agents, carbon black, graphite, carbon nanotubes, and residues from polymerization processes including catalysts, salts and derivatives thereof.

13. A moulded body made from a polyamide moulding or having at least one region or one coating of a polyamide moulding compound, said polyamide moulding compound being defined by claim 1, produced by injection moulding, extrusion or blow-moulding.

14. The moulded body according to claim 13, wherein it is a moulded body for applications in the sanitary field, plug-in connectors, connectors, including those for petrol, diesel, urea, and compressed air lines, profiles, sheets or layers of multilayer sheets, electronic components, headlamp housing, reflectors, adaptive headlight systems, gear wheels, housing for electronic components, tools, composite materials, plastic-rubber composites, nozzles, and fittings for connecting hoses or pipes.

15. The polyamide moulding compound according to claim 1, wherein the sum of the components (a3) and (a4), based on 100 wt. % of the polyamide (A), lies in the range from 8-12 wt. %.

16. The polyamide moulding compound according to claim 1, wherein the partially crystalline, partially aromatic polyamide of component (A) is made up of:
(a1) 62-68 wt. %, of 6T units, formed from 1,6-hexanediamine and terephthalic acid;
(a2) 23-29 wt. %, of 6I units, formed from 1,6-hexanediamine and isophthalic acid;
(a3) 5-13 wt. %, of 612 units, formed from 1,6-hexanediamine and dodecanedioic acid;
(a4) 0-4 wt. % of one of the following units: 66 units, formed from 1,6-hexanediamine and adipic acid; 68 units, formed from 1,6-hexanediamine and suberic acid; 69 units formed from 1,6-hexanediamine and azelaic acid; 610 units formed from 1,6-hexanediamine and sebacic acid; 6 units formed from ε-caprolactam; or a mixture of such units;
wherein the sum of the components (a1) to (a4) makes up 100 wt. % of the polyamide (A).

17. The polyamide moulding compound according to claim 1, wherein the constituent (a4) of the partially crystalline, partially aromatic polyamide of component (A) is exclusively provided by 66 units, formed from 1,6-hexanediamine and adipic acid, in a proportion in the range from 0-5 wt. %.

18. The polyamide moulding compound according to claim 1, wherein a molecular mass and/or terminal groups of the least one partially crystalline, partially aromatic polyamide are adjusted by means of at least one aliphatic, cycloaliphatic or aromatic monofunctional carboxylic acid, selected from the following group: acetic acid, propionic acid, stearic acid, 2-ethylhexanoic acid, cyclohexanoic acid and benzoic acid or mixtures thereof, wherein the mole ratio of the monofunctional carboxylic acid to 1,6-hexanediamine lies in the range from 0.5-5 mol. %,
and/or that the mole ratio of 1,6-hexanediamine to the sum of the dicarboxylic acids used is at least 1.03, and at most 1.15.

19. The polyamide moulding compound according to claim 1, wherein the component (A) and/or the polyamide moulding compound as a whole has a melting point, determined according to ISO Standard 11357-3 on granules using differential scanning calorimetry (DSC) with a heating rate of 20° C./min, in the range from 300-315° C.;
and/or that the component (A) and/or the polyamide moulding compound as a whole has a glass transition temperature, determined according to ISO Standard 11357-2 on the granules using differential scanning calorimetry (DSC) with a heating rate of 20° C./min, in the range from 120-125° C.;
and/or that the component (A) and/or the polyamide moulding compound as a whole has a water absorption, after storage at 95° C. in water over a period of 336 hours, of at most 3.35%;
and/or that the component (A) and/or the polyamide moulding compound as a whole has a strain at break, measured according to ISO 527 with a drawing speed of 5 mm/min, at a temperature in the range from 120-140° C., in the range from 6-10%;
and/or that the component (A) and/or the polyamide moulding compound as a whole has a strain at break, measured according to ISO 527 with a drawing speed of 5 mm/min, after storage at a temperature of 130° C. for 1008 hours according to GM Standard GMW15468 (2011) in a glycol-water mixture (1:1), of in the range from 2.3-4%;

and/or that the component (A) and/or the polyamide moulding compound as a whole has a solution viscosity ($\eta_{rel}$), measured according to DIN EN ISO 307, in 0.5 wt. % m-cresol solution, temperature 20° C., granules, between 1.50 and 1.80;

and/or that the component (A) and/or the polyamide moulding compound as a whole has an enthalpy of fusion, determined according to ISO Standard 11357-3 on the granules using differential scanning calorimetry (DSC) with a heating rate of 20° C./min, in the range from 25-45 J/g.

20. The polyamide moulding compound according to claim 1, wherein the component (B) is present in a proportion, based on the sum of the components (A)-(E), in the range from 35-45 wt. %.

21. The polyamide moulding compound according to claim 1, wherein the component (B) is made up of glass fibres or contains glass fibres, wherein the glass fibres have a circular cross-section, with a diameter in the range from 5-20 μm, or a non-circular cross-section, wherein the dimensional ratio of the major cross-section axis to the minor cross-section axis standing perpendicular thereto is greater than 2.5.

22. The polyamide moulding compound according to claim 1, wherein the component (C) is present in a proportion, based on the sum of the components (A)-(E), in the range from at most 0.1-5 wt. %.

23. The polyamide moulding compound according to claim 1, wherein the component (C) contains spheroidal and/or ellipsoidal fillers or is made up of these, wherein silicate, metal, plastic, metal oxide, glass, mineral substance, dye, pigment particles and mixtures thereof are used.

24. The polyamide moulding compound according to claim 1, wherein the component (C) contains spheroidal and/or ellipsoidal fillers or is made up of these, wherein the fillers of component (C) are as fillers, in surface-treated or untreated form, selected from the group consisting of: talc, mica, silica, including iron aluminum silicate and/or sodium aluminum silicate particles, quartz, quartz powder, titanium dioxide, wollastonite, kaolin, silicic acids, including amorphous silicic acids, ground or precipitated calcium carbonate, magnesium carbonate, magnesium hydroxide, chalk, limestone, feldspar, mica, barium sulphate, barium titanate, zinc sulphide, glass beads, including solid or hollow glass beads, ground glass, including ground glass fibres, glass scales, glass flakes, permanent magnetic or magnetizable metal compounds or alloys, inorganic pigments including iron oxide, iron manganese oxide, metal powders, including iron powder, copper powder, aluminum powder, metal flakes, including aluminum flakes, iron flakes, metal-coated fillers, metal oxides in the form of spinels, including copper iron spinel, copper chromium oxide, copper chromite ($CuCr_2O_4$), zinc-iron oxide, cobalt-chromium oxide, cobalt-aluminum oxide, magnesium aluminum oxide, copper-chromium-manganese mixed oxides, copper-manganese-iron mixed oxides, nickel-antimony titanate, chromium antimony titanate, hollow sphere silicate fillers, aluminum oxide, boron nitride, boron carbide, aluminum nitride, calcium fluoride, and mixtures of the components form this group.

25. The polyamide moulding compound according to claim 1, wherein the component (D) is present in proportion, based on the sum of the components (A)-(E), in the range 0.2-1.5 wt. %, or in that the component (D) is selected from the following group:

compounds of mono or divalent copper with inorganic or organic acids or mono or divalent phenols, the oxides of mono or divalent copper, or the complex compounds of copper salts with ammonia, amines, amides, lactams, cyanides, or phosphines, including Cu(I) or Cu(II) salts of the hydrogen halide acids, hydrogen cyanide acids or the copper salts of the aliphatic carboxylic acids, wherein the monovalent copper compounds are CuCl, CuBr, CuI, CuCN and $Cu_2O$, and the divalent copper compounds are $CuCl_2$, $CuSO_4$, CuO, copper (II) acetate or copper (II) stearate, or mixtures of these compounds;

stabilizers based on secondary aromatic amines, wherein these stabilizers are present in a quantity of 0.2 to 2 wt. % based on the sum of the components (A)-(E), stabilizers based on sterically hindered phenols, wherein these stabilizers are present in a quantity of 0.1 to 1.5 wt. % based on the sum of the components (A)-(E), phosphites and phosphonites, and mixtures of the aforesaid stabilizers.

26. The polyamide moulding compound according to claim 1, wherein the component (E) is present in a proportion, based on the sum of the components (A)-(E), in the range 0.2-3 wt. %, and/or that the component (E) is selected from the following group: aliphatic polyamides, crystallization accelerators or retardants, flow aids, lubricants, parting agents, pigments, dyes and marking substances, processing aids, antistatic agents, carbon black, graphite, carbon nanotubes, and residues from polymerization processes including catalysts, salts and derivatives thereof.

27. A moulded body made from a polyamide moulding compound or having at least one region or one coating of a polyamide moulding compound, said polyamide moulding compound being defined by claim 1, produced by injection moulding, extrusion or blow-moulding, wherein it is the moulded body for a coolant circuit of automobiles, including coolant manifolds, coolant fluid lines, water inlets and outlets, thermostats, coolers, cooling water boxes, pumps, valves and connectors in the coolant circuit or components of these parts, or in the form of fuel lines, hydraulic lines, brake lines, clutch lines, urea lines or brake fluid tanks or fuel tanks.

28. The moulded body according to claim 13, wherein it is a moulded body for applications in the following:

sanitary components including water meters, water meter housings and water met components, including bearings, propellers, uprights, pipe couplings, fittings, for drinking water use, valves, taps, cooling systems including systems in automobile production, including cooling water pumps, wherein moulded bodies in the form of or as part of a component for the automobile sector, selected from the cylinder head covers, engine covers, housings for intercoolers, intercooler valves, induction pipes, induction parts for heat exchangers, coolant coolers, intercoolers, thermostats, water pumps, radiators, and mounting parts, domestic appliances, including water heaters, rice cookers, steam cookers, steam irons, parts for tea and coffee machines, plug-in connectors, connectors, including those for petrol, diesel, urea, and compressed air lines, profiles, sheets or layers of multilayer sheets, and electronic components, headlamp housing, reflectors, adaptive headlight systems, gear wheels, housing for electronic components, tools, composite materials, plastic-rubber composites, nozzles, and fittings for connecting hoses or pipes.

\* \* \* \* \*